US005641612A

United States Patent [19]
Lee et al.

[11] Patent Number: 5,641,612
[45] Date of Patent: Jun. 24, 1997

[54] METHOD FOR MANUFACTURING SELF-ALIGNED OPTIC FIBER-OPTIC ELEMENT COUPLING DEVICE

[75] Inventors: Sang-Hwan Lee; Gwan-Chong Joo; Hong-Man Kim; Dong-Goo Kim, all of Daejeon, Rep. of Korea

[73] Assignees: Electronics and Telecommunications Research Institute, Daejeon-shi; Korea Telecommunication Authority, Seoul, both of Rep. of Korea

[21] Appl. No.: 556,544

[22] Filed: Nov. 28, 1995

[30] Foreign Application Priority Data

Nov. 30, 1994 [KR] Rep. of Korea .................. 94-32106

[51] Int. Cl.⁶ .................................................. G02B 6/42
[52] U.S. Cl. .......................... 430/321; 430/317; 385/39; 385/49; 216/24; 438/65; 438/98
[58] Field of Search ............................. 430/321, 312, 430/314, 316, 317; 385/38, 39, 49, 50, 51, 52, 88, 91; 216/24; 156/659.11

[56] References Cited

U.S. PATENT DOCUMENTS 4,892,377  1/1990  Randle ........................................ 385/39

OTHER PUBLICATIONS

Wale, et al.: "Self–Aligned Flip–Chip Assembly of Photonic Devices with Electrical and Optical Connections"; pp. 780–786; IEEE Transactions on Components, Hybrids, and Manuf. Tech., vol. 13, No. 4. Dec. 1990.

Armiento, et al.: "Gigabit Transmitter Array Modules on Silicon Waterboard"; pp. 1072–1078; IEEE Transaction On Components, Hybrids, and Manufacturing Tech., vol. 15, No. 6, Dec. 1992.

Jackson, et al.: "A Compact Multichannel Transceiver Module Using Planar–Processed Optical Waveguides and Flip–Chip Optoelectronic Components"; pp. 93–97; 42nd ECTC Conference 1992.

*Primary Examiner*—John A. McPherson
*Attorney, Agent, or Firm*—Larson and Taylor

[57] ABSTRACT

A method for manufacturing self-aligned optic fiber-optic element coupling devices is described. The method comprises the steps of forming a first insulating film on a silicon substrate, forming metal pads on the first insulating film to have a predetermined separation distance, forming a second insulating film on the first insulating film and the metal pads, forming a photosensitive film to have first openings and a second opening, the first openings positioned on the metal pads with the metal pads partially covered with the second insulating films and the second opening positioned between the first openings on the first and second insulating films and extended to a side of the silicon substrate, removing the first and second insulating films exposed by the first and second openings using the photosensitive film as mask to exposure the silicon substrate and the metal pads, removing the photosensitive film, forming a V-shape groove in the exposed portion of the silicon substrate using the first and second insulating films as etching mask, and forming solder bumps on the metal pads.

4 Claims, 2 Drawing Sheets

METHOD FOR MANUFACTURING SELF-ALIGNED OPTIC FIBER-OPTIC ELEMENT COUPLING DEVICE

FIELD OF THE INVENTION

The present invention relates to a method for manufacturing self-aligned optic fiber-optic element coupling devices, and more particularly, to a method for manufacturing self-aligned optic fiber-optic element coupling devices capable of aligning a wave guide of the optic element to be mounted with a core of the optic fiber.

BACKGROUND OF THE INVENTION

When an optic element of for example a laser diode or photo diode is coupled to a optic fiber, an wave guide of the optic element must be aligned with a core of the optic fiber with a precision of ±1 μm in the horizontal direction and ±1.0 μm in the vertical direction to transmit light emitted from the optic element to the optic fiber without loss.

An optic fiber-optic element coupling device has been used in the prior art in which used a V-shape groove for mounting the optic fiber and a solder bump for flip chip bonding the optic element is formed so as to align the optic element with the optic fiber precisely.

A method for self-aligning a optic fiber with a optic element using the optic fiber-optic element coupling device mentioned above is disclosed in IEEE TRANSACTIONS ON COMPONENTS, HYBRIDS, AND MANUFACTURING TECHNOLOGY, VOL. 13, NO. 4, pp. 780–786, DECEMBER(1990).

The optic fiber is mounted on a silicon substrate having a V-shape groove capable of being dimension controlled precisely and then the optic element is flip chip bonded using a solder bump to align the wave guide with the core of the optic fiber by the method described in the above documents.

This method has a good optic coupling efficiency and a superior electric and thermal property that is better than existing wire bonding technology because the wave guide of the optic element is aligned with the core of the optic fiber having a small error of ±1 μm both in the horizontal and vertical direction.

And in the optic element-optic fiber coupling device for self-aligning the optic element with the optic fiber, metal pads are formed by vacuum evaporation process and a photolithography technology on a predetermined portion of the top surface of a silicon substrate having an insulating film formed on the surface thereof and a V-shape groove is formed by an anisotropic etching method.

And, an insulating film is formed and partially removed to expose a predetermined portion on which solder bumps are formed on the metal pads.

However when the steps at forming the V-shape groove and exposing the metal pads to form the solder bump is performed by different processes using different mask, there is alignment error between the V-shape groove and the solder bumps, especially when the V-shape groove has a large width and a depth, the alignment error increases, and the coupling efficiency between the optic element and the optic fiber deteriorates.

SUMMARY OF THE INVENTION

It is, therefore, an object of the invention to provide a method for manufacturing a self-aligned optic fiber-optic element coupling device capable of preventing an alignment error from arising between a V-shape groove and solder bumps to improve the optic coupling efficiency between the optic fiber and the optic element.

In accordance with the invention, there is provided a method for manufacturing a self-aligned optic fiber-optic element coupling devices. The method comprises the steps of forming a first insulating film on a silicon substrate, forming metal pads on the first insulating film to have a predetermined separation distance, forming a second insulating film on the first insulating film and the metal pads, forming a photosensitive film with a plurally of first openings and a second opening, the first openings positioned on the metal pads with the metal pads partially covered with the second insulating film and the second opening positioned between the first openings on the first and second insulating films and extended to a side of the silicon substrate, removing the first and second insulating films exposed by the first and second openings using the photosensitive film as a mask to expose the silicon substrate and the metal pads, removing the photosensitive film, forming a V-shape groove in the exposed portion of the silicon substrate using the first and second insulating films as etching mask, and forming solder bumps on the metal pads.

BRIEF DESCRIPTION OF THE DRAWING

The above and other objects and features of the present invention will become apparent from the following description given with reference to the accompanying drawings, wherein.

DETAILED DESCRIPTION OF THE PREFERRED EMBODIMENTS

FIG. 1(A) to FIG. 1(D) are process diagrams of a self-aligned optic fiber-optic element coupling device in accordance with the invention.

Figure 1A:
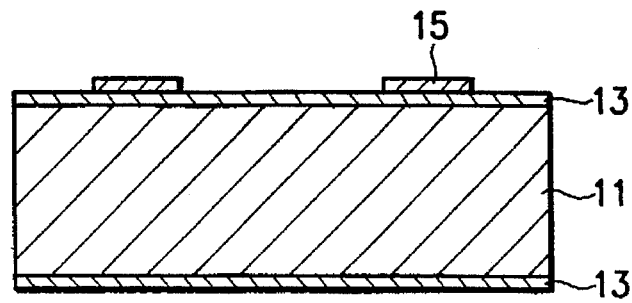
FIG. 1(A) to FIG. 1(D) are process diagrams of a self-aligned optic fiber-optic element coupling device in accordance with the present invention.

Referring to FIG. 1(A), a silicon nitride film or a silicon oxide film is deposited on a top and bottom surface of a silicon substrate 11 having a crystal plane (100) by chemical vapor deposition or a thermal oxidation method to form a first insulating film 13. Then metal pads 15 are formed at a predetermined position on the top surface of the first insulating film 13 so as to have a predetermined separation distance by in photolithography method and lift-off method. The metal pads 15 are made of metal such as Au/Pt/Cu/Cr or Au/Pt/Ni/Ti. The first insulating film 13 electrically isolates the silicon substrate 11 and the metal pads 15.

Figure 1B:
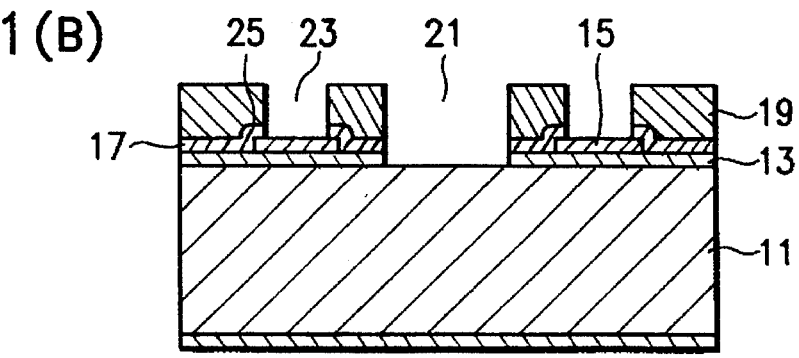

Referring FIG. 1(B), a silicon nitride film or silicon oxide film is deposited on a top surface of the first insulating film 13 and the metal pads 15 by chemical vapor deposition or a low thermal deposition method to form a second insulating film 17. And a top surface of the second insulating film 17 is applied with a patterned photosensitive film 19, exposed and developed for forming first and second openings 21 and 23 to expose the second insulating film 17. The second openings 23 are formed to correspond to the metal pad 15 and to overlap predetermined portions thereof with it and the first opening 21 has a width corresponding to the diameter of a optic fiber to be mounted between the metal pads and the height of the core of optic fiber and is formed in <110> direction to parallel to a flat plane of (100) wafer edge so as not to overlap a side thereof with the second openings 23 and to extend the other side thereof to a side surface of the silicon substrate 11. And then the exposed first and second insulating films 13 and 17 by the first and second opening 21 and 23 is removed by dry etching such as a reactive ion etching method using the photosenstive film 19 as a mask to exposed the silicon substrate 11 and the metal pads 15. At that time, the second insulating film 17 on the metal pads 15 is etched at exposed center portion thereof through the second opening 23 and a predetermined portion covered with the photosensitive film 19 is not removed and leaved. The unremoved portion of the second insulating film 17 on the metal pad 15 forms a solder dam 25 for restricting a position of the solder bump within the top of the solder pad 15 at flip chip bonding.

Figure 1C:
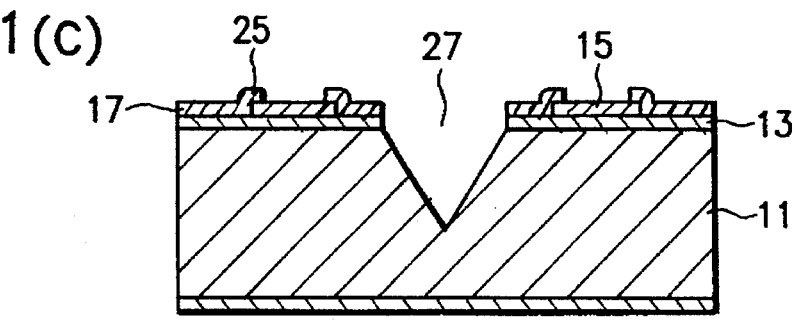

Referring to FIG. 1(C), the photosensitive film 19 is removed and then the portion of the silicon substrate 11 exposed by the first opening 21 is etched with KOH or EDP(Ethylene Diamine Pyrocatechol) solution using the first and second insulating film 13 and 17 as mask to form a V-Shaped groove 27. As the V-Shaped groove 27 formed in the silicon substrate 11 has crystal plane <111> and the silicon substrate 11 has an etching rate of several tens to 500:1 between crystal plane {100} and {111} with respect to KOH or EDP solution, the etching rate in the horizontal direction is larger then it is in the vertical direction to form the V-shape groove 27. The lower part of the metal pads 15 are prevented from etching by Au and Pt thin film consisting it.

Figure 1D:
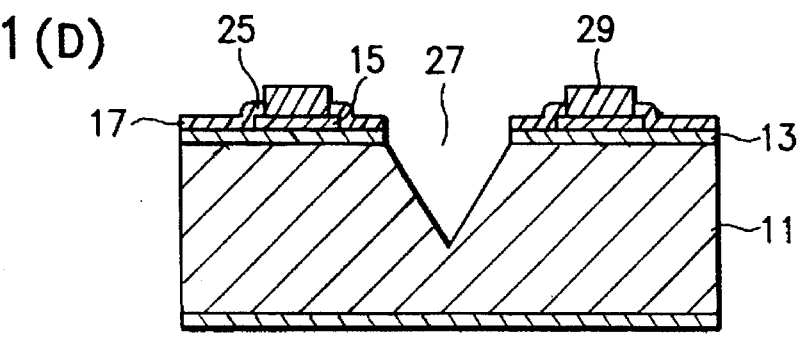

Referring to FIG. 1(D), solder bumps 29 are formed with metal such as PbSn having a good electric conductivity and a low melting point through lift-off procedure on the metal pads 15. Generally, the solder bumps 29 tend to contact with the metal pad 15 than the second insulating film 17 at the time of reflow for flip chip bonding optic elements. Therefore, it is permitted to generate alignment error of several micrometers between the metal pads 15 and the solder bumps 29.

Figure 2:
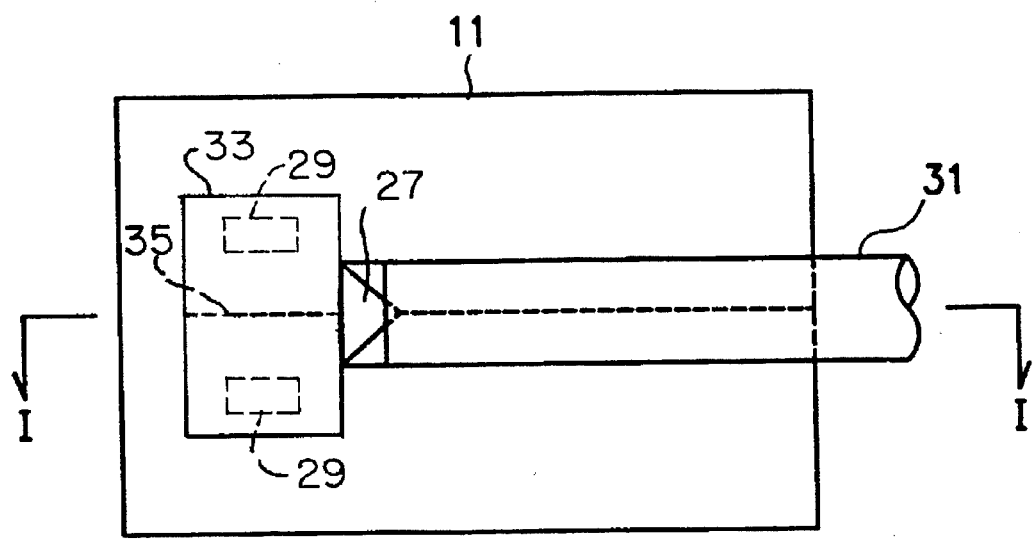
FIG. 2 is a plan view of a structure in which the self-aligned optic fiber-optic element coupling device manufactured in accordance with FIG. 1(A) to FIG. 1(D) is coupled to a optic fiber and an optic element.
Figure 3:
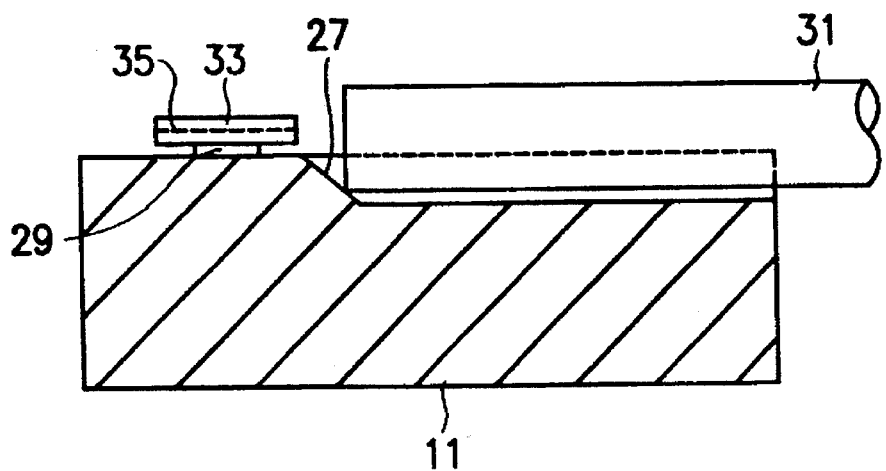
FIG. 3 is a cross-sectional view taken on line I—I of FIG. 2.

FIG. 2 is a plan view of a structure in which the self-aligned optic fiber-optic element coupling device manufactured in accordance with the invention is coupled to a optic fiber and a optic element, and FIG. 3 is a cross-sectional view taken on line I—I of FIG. 2.

FIG. 2 and FIG. 3 show that optic fibers 31 are mounted in the V-shape groove 27 formed in the silicon substrate 11 and the optic element 33 having an axis 35 is bonded by solder bumps 29. In the optic fiber-optic element coupling device according to the present invention, because the V-shape groove 27 and solder dams 25 are formed without alignment error, when the optic element 33 is flip chip bonded, the wave guide of the optic element 33 is aligned with axis 35 of the core of the optic fiber by position restoring force caused by surface tension of the solder bumps 29.

As described above, the etching pattern for forming the V-shape groove on the silicon substrate and the solder dams for determining mounting position of the optic element in flip chip bonding are performed with same mask and process. Therefore, an alignment error is presented being from generating between the V-shape groove and the solder dams, which improves the optic coupling efficiency between the bonded optic element and the mounted optic fiber.

Although the present invention has been described with respect to the preferred embodiments, the invention is not limited to the foregoing embodiments but many modifications and variations are possible within the spirit and scope of the appended claims of the invention.

What is claimed is:

1. A method for manufacturing a self-aligned optic fiber-optic element coupling device comprising the steps of:

forming a first insulating film on a silicon substrate;

forming two spaced apart metal pads on the first insulating film;

forming a second insulating film on the first insulating film and on at least a part of the metal pads;

applying a patterned photosensitive film on the surface of said second insulating film such that a plurality of first openings positioned on the metal pads with the metal pads partially covered with a portion of the second insulating film and a second opening positioned between the first openings and extending to a side of the silicon substrate are defined;

removing the second insulating film defined by said first openings and removing the first and second insulating films defined by the second opening;

removing the photosensitive film;

forming a V-shaped groove in the exposed portion of the silicon substrate using the first and second insulating films as a mask; and forming solder bumps on the metal pads.

2. The method of claim 1 wherein the silicon substrate has a (100) crystal plane.

3. The method of claim 1, wherein the V-shaped groove forming step includes forming the V-shaped groove in the <100> direction to be parallel to a flat plane of the silicon substrate.

4. The method of claim 3, further comprising a step of etching the silicon substrate with KOH or EDP to form the V-shaped groove.

* * * * *